(No Model.)
D. H. RICE.
CLUTCH FOR TRICYCLES.
No. 336,588. Patented Feb. 23, 1886.
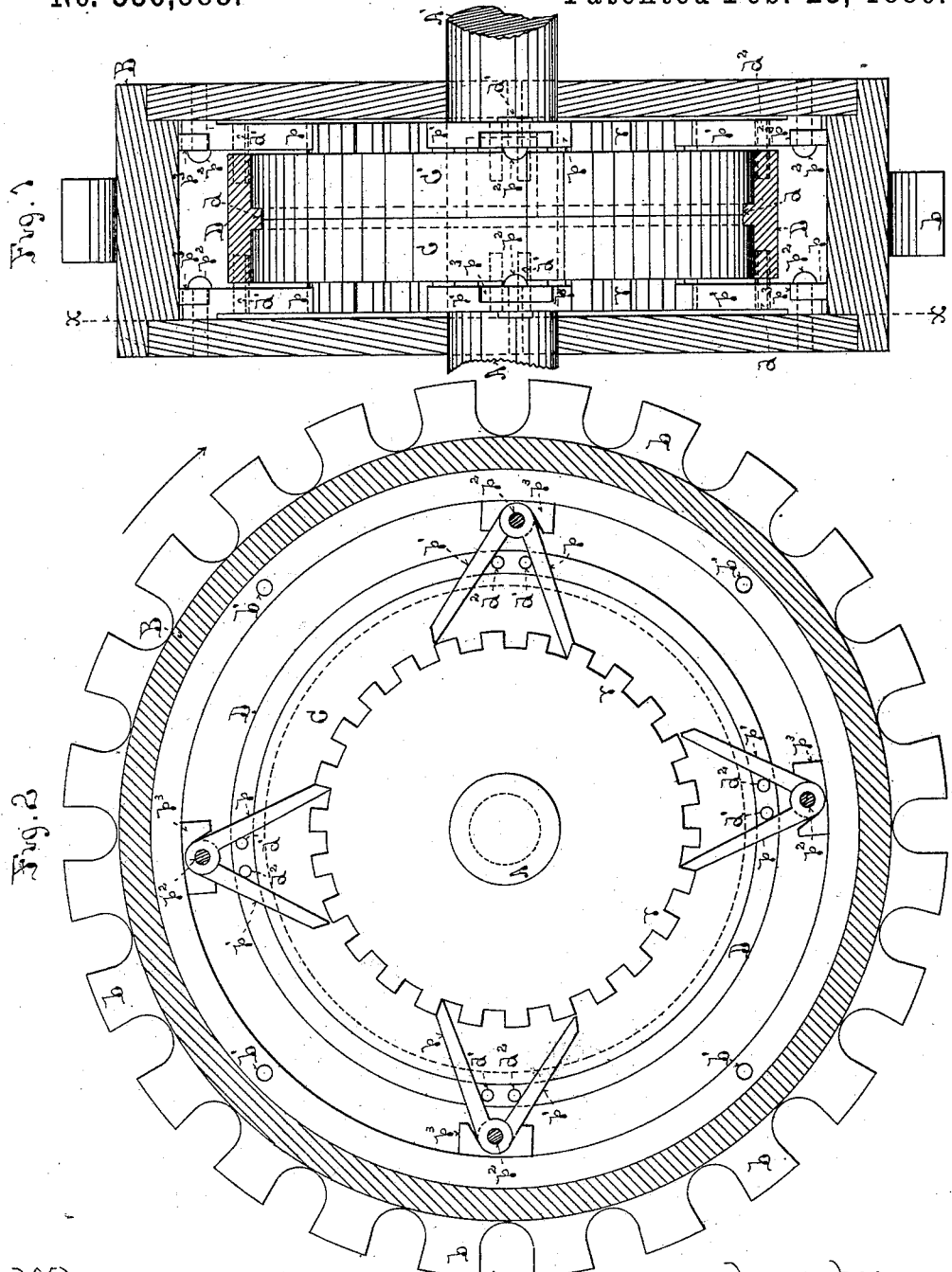
Witnesses
Wm. S. Brown
N. P. Ockington
Inventor
David Hall Rice

UNITED STATES PATENT OFFICE.

DAVID HALL RICE, OF BROOKLINE, MASSACHUSETTS.

CLUTCH FOR TRICYCLES.

SPECIFICATION forming part of Letters Patent No. 336,588, dated February 23, 1886.

Application filed November 11, 1885. Serial No. 182,428. (No model.)

*To all whom it may concern:*

Be it known that I, DAVID HALL RICE, of Brookline, in the county of Norfolk and State of Massachusetts, have invented a new and useful Improvement in Clutches for Tricycles, of which the following is a specification.

My invention relates to clutches for tricycles and other similar machines, where one portion of a divided shaft is to be allowed to race ahead of the driving mechanism while the other is driven at the normal rate of speed; and it consists in certain novel combinations and modifications of the several parts, substantially as hereinafter described and claimed.

In the drawings, Figure 1 is an edge view of the clutch mechanism, partly in section transversely, to show the working parts. Fig. 2 is a sectional view of the same on the line $x\ x$ of Fig. 1.

A A' is the divided shaft of the tricycle, the part A being attached to one of the opposite driving-wheels at its outer end, and the part A' to the other in the usual manner. These parts abut together midway within the outer box or casing, B, which is formed of an outer cylinder carrying the sprocket gear-teeth $b\ b$, and two opposite disk-faces bolted together by bolts or screws passing into holes $b'\ b'$ in the cylinder. The divided shaft A A' passes axially through the faces of the box B, and the latter revolves on the shaft on the bearings thus formed.

Within the box and secured to the shaft are the disks C C', the disk C being firmly secured to the part A of the shaft, and the disk C' to the part A', where these parts abut, just sufficient space being left between the faces of the disks nearest each other to allow them to revolve without frictional contact. Each of these disks consists of two portions—a larger smooth cylindrical portion and a ratchet portion, $r$. This ratchet portion has teeth around its periphery, which are adapted to receive a pawl projecting in either direction, as shown.

Around the exterior of the cylindrical portions of the disks C C' is placed a loose sleeve or ring, D, which I term the "pawl-keeper," because its function is to control the action of the pawls. To prevent lateral displacement of this sleeve, an annular rib, $d$, is formed around its interior, which projects into a corresponding groove formed half in disk C and half in C', as shown in Fig. 1. These parts are so fitted that the ring D has a "running fit" upon the disks, allowing it to revolve on them, or either one of them to revolve in it. Opposite to and around the outside of each of the ratchets $r\ r$ of the disks C C' gravity-pawls $p\ p'$ are secured on pivots $p^2$ in the box B in such a position as to drop down into the ratchets $r$ when above them in the rotation of the box. The pawls $p$ project in one direction and the pawls $p'$ in the other, being hung in pairs on each pivot, and a sufficient number of pawls are placed around the ratchets, inside of the box, to insure one or more pairs always being on the upper side ready to engage with their ratchets. The pawls are hung loosely upon their pivots, so as to drop freely downward, and they are socketed at their bases in projections $p^3\ p^3$, formed within the cylinder part of box B, to enable them to sustain the "end-thrust" when they engage with the ratchets. These sockets are so formed as to only just permit each pawl to be raised clear of the ratchet-teeth, as is shown of the pawls $p'\ p'$ in Fig. 2, when the projection $p^3$ forms a stop to prevent its rising farther. If, now, the pawls were left unobstructed in their action, it is evident that when the pulley-box B was revolved in one direction one or more of the pawls $p$ would fall into the ratchets and carry both disks C C' with it, and if revolved in the other, one or more pawls, $p'\ p'$, would fall into the ratchets and carry the disks along in like manner. Conversely, neither disk could be revolved in the pulley-box in either direction. To enable the pulley-box to always carry the disks with it in each direction, while allowing either disk to freely run faster than the pulley-box and the other disk, I fix in the opposite edges of the pawl-keeper ring D pins $d'\ d^2$, which project horizontally each way between each pair of pawls $p\ p'$, and impinge against the latter when the pulley-box B is revolved, the pins $d'$ lifting the pawls $p$ and the pins $d^2$ lifting the pawls $p'$ as the pulley-box is revolved one way or the other. Furthermore, the distance between the pins $d'$ and $d^2$ of each pair on the edge of the pawl-keeper ring is such, and each pair of pins is so placed between the pairs of pawls, that when either the set $d'$ or $d^2$ of pins has lifted its corresponding set of pawls as far as possible out of the ratchet the other set of pins will just abut against those of its corresponding set of pawls, which are locked into the ratchet-teeth, as shown in Fig. 2.

It is of course understood that the ratchet and pawls and keeper-pins of the disk C' are like those shown for disk C in Fig. 2 in their relative arrangement—that is, when pins $d'$ lift out their set of pawls from the ratchet of disk C, the corresponding pins lift out their corresponding pawls from the ratchet of disk C', and vice versa.

The purpose of the mechanism is to allow either of the disks C or C' to race or run faster than the pulley-box B and the other disk, and thus allow the outer wheel of the tricycle, as the case may be, in turning a corner to run independently of the inner or driven wheel in a manner well understood, whether the machine be driven forward or backward, while at the same time insuring that the pulley-box B shall drive both wheels either forward or backward in a direct course.

The operation of the clutch mechanism is as follows: Suppose the pulley-box to be driven forward in the direction of the arrow in Fig. 2. Then the friction of the pawl-keeper D on the disks C C' causes the pawls to be carried along with the pulley-box over the pins $d'$ $d^2$ of the pawl-keeper, thus allowing the pawls $p$ to drop into their ratchets, and lifting the pawls $p'$ out of their ratchets in both disks C C', and carrying the disks and pawl-keeper along with the pulley as soon as this occurs. In the meantime the tension or end-thrust on the pawls $p$ causes them to hold back the pawl-keeper, (by bearing on pins $d'$,) so that pawls $p'$ $p'$ will be kept lifted out of their ratchets by the pins $d^2$; but since the pawls $p$ $p$ on one side of the box alone will hold back the pawl-keeper in this manner the pawls $p$ of that one side will keep the pawls $p'$ $p'$ of both sides or ratchets lifted out of the latter. Therefore, when the tricycle turns a corner with the wheel of shaft A' and disk C' outside, and that connected wheel, shaft, and disk begin to race or run faster than the pulley-box B and disk C, (which is connected to the inside or slow-moving wheel,) they are free to do so, because their pawls $p'$ are held away from the ratchet of disk C' by the opposite locked pawls $p$ of disk C acting through pins $d'$, pawl-keeper D, and pins $d^2$. If the motion of the pulley-box B is reversed, the action of the pawls $p$ $p'$ will be reversed, and both disks and the tricycle-wheels will be driven backward while one is allowed to race or run ahead in backing around a corner, as above described in turning a corner while going ahead.

Since under no circumstances in the use of the machine are both disks C C' allowed or made to race ahead of pulley-box B at once, there are no movements of the tricycle which the clutch mechanism will not control and permit to be performed, while permitting the machine to operate with an exceedingly small amount of friction. It is necessary to the successful operation of the mechanism that the pawl-keeper shall always be held backward against the rear pawls of each pair with sufficient force to lift them out of the ratchets in whichever direction the pulley may be revolved, and this is accomplished by making the frictional bearing-surface of the pawl-keeper D on which it revolves greater than the friction of the pins of the pawl-keeper in lifting the pawls. While the pawl-keeper may thus be made to operate by friction alone, the locking of it in place by the forward pawls, or either set of them alone, insures that certainty in its operation in keeping the rear pawls raised, which is desirable.

It is evident that each pair of pins $d'$ $d^2$ may be made in the form of a stud projecting from the pawl-keeper, and as wide across circumferentially of the latter as from outside to outside of the pins, as the pins are essentially integral with the keeper. It is also evident that the pawls and ratchets may be reversed, and the ratchets may be carried by the pulley-box and the pawls by the disks C C'. The pawls may also be actuated by springs, instead of gravity, in engaging with the ratchets, although I prefer the latter. One set of pins, $d'$ or $d^2$, may also be used between each pair of ratchets, instead of two. The pawl-keeper D may also be made to revolve upon one or both portions, A A', of the shaft between the ratchets $r$ $r$, instead of outside of disk C C'; but I prefer the construction before described. It is also evident that the pawls $p'$ of one of the ratchets $r$ may be left off and the tricycle be driven backward by the pawls $p'$ of the opposite ratchet, propelling only one wheel, if desired. Driving-pulley box B may also be divided transversely of the shaft and centrally through it into two parts, and the exterior of each part be provided with a sprocket-gear, and both parts be driven by separate chain belts from a common shaft, without departing from the spirit of my invention.

What I claim as new and of my invention is—

1. The combination of shaft A, ratchet $r$, box B, carrying two oppositely-inclined pawls, $p$ $p'$, and a pawl-keeper, D, adapted to alternately release one pawl or the other from the ratchet as the box is revolved in one direction and the other, substantially as described.

2. The combination of shaft A, ratchet $r$, box B, carrying two or more pairs of oppositely-inclined pawls, $p$ $p'$, and pawl-keeper D, adapted to release each set of pawls $p$ or $p'$ alternately from the ratchet as the box is revolved in one direction and the other, substantially as described.

3. The combination of shaft A, ratchet $r$, box B, carrying one or more gravity-pawls, $p$, and a pawl-keeper, D, adapted to move the pawl or pawls out of the path of the ratchet-teeth when brought against the pawl by the rotation of the box, and to revolve with the latter as such rotation is continued, substantially as described.

4. The combination of shaft A, ratchet r, box B, carrying two or more oppositely-inclined gravity-pawls, p p', and a pawl-keeper, D, adapted to alternately move the pawls out of the path of the ratchet-teeth when brought against them by the rotation of the box in opposite directions, and to revolve in either direction with the latter as the rotation is continued, substantially as described.

5. The combination of shafts A A', ratchets r r, connected to them, respectively, box B, carrying two or more pawls, p p, opposite to and engaging with the ratchets, respectively, and the pawl-keeper D, common to the pawls of each ratchet, and adapted to move said pawls out of the paths of their respective ratchet-teeth when brought against them by the rotation of the box, substantially as described.

6. The combination of the shafts A A', ratchets r r, connected to them, respectively, box B, carrying two or more pairs of oppositely-inclined pawls, p p', engaging with the ratchets, respectively, and the pawl-keeper D, common to the pawls of each ratchet, and adapted to alternately move said pawls p or p' out of the paths of their respective ratchet-teeth when brought against them by the rotation of the box in opposite directions, substantially as described.

7. The combination of the shafts A A', disks C C', connected thereto, respectively, and each having a cylindrical portion and attached ratchet r, box B, carrying two or more pawls, p p', engaging with the ratchets, respectively, and the common pawl-keeper D, revolving around the peripheries of disks C C', and adapted to move said pawls out of the paths of their respective ratchet-teeth when brought against them by the rotation of the box, substantially as described.

8. The combination of the shafts A A', disks C C', connected thereto, respectively, and each having a cylindrical portion and attached ratchet r, box B, carrying two or more pairs of oppositely-inclined pawls, p p', engaging with the ratchets, respectively, and the common pawl-keeper D, revolving around the peripheries of disks C C', and adapted to alternately move said pawls p or p' out of the paths of their respective ratchet-teeth when brought against them by the rotation of the box in opposite directions, substantially as described.

9. The combination of shafts A A', ratchets r r, connected to them, respectively, box B, carrying opposite one of said ratchets one or more pairs of oppositely-inclined engaging-pawls, p p', and opposite the other of said ratchets one or more engaging-pawls, p, and the pawl-keeper D, adapted to support the pawl or pawls p' out of the path of their ratchet-teeth when brought against them by the rotation of the box, and to be locked in that position by the pawl or pawls p of the opposite ratchet, substantially as described.

10. The combination of shafts A A', ratchets r r, connected to them, respectively, box B, carrying opposite said ratchets, respectively, two or more pairs of oppositely-inclined engaging-pawls, p p', and the pawl-keeper D, adapted to support alternately the pawls p or p' out of the path of their respective ratchet-teeth when brought against them by the rotation of the box B, and to be locked in either position by the opposite pawl or pawls, p' or p, substantially as described.

11. The combination of shafts A A', ratchet r, connected to shaft A, box B, carrying opposite said ratchet one or more pairs of oppositely-projecting engaging-pawls, p p', a pawl-keeper, D, adapted to support one of said pawls out of the path of its ratchet-teeth when brought against it by the rotation of the box, and mechanism connected to the opposite shaft, A', and adapted to automatically lock said pawl-keeper in said supporting position, substantially as described.

12. The combination of shafts A A', carrying disks C C', attached thereto, respectively, each provided with ratchet-teeth r r, the pawl-keeper D, rotating around and overlapping said disks and having a limited rotary motion within the box B, by which it is carried around, the box B revolving around said disks and pawl-keeper, and pawls p or p', governed by the limited motion of said pawl-keeper into or out of engagement with said ratchet-teeth, substantially as described.

13. The combination of the shafts A A', carrying disks C C', attached thereto, respectively, each provided with ratchet-teeth r r, and the single box B, adapted to be rotated by mechanism applied to its exterior surface, and carrying two sets of gravity-pawls, p or p', adapted to engage with the ratchet-teeth of said disks, substantially as described.

DAVID HALL RICE.

Witnesses:
WILLIAM P. BLAKE,
N. P. OCKINGTON.